(12) United States Patent
McAlinden

(10) Patent No.: US 7,027,766 B2
(45) Date of Patent: Apr. 11, 2006

(54) REDUCING THE TIME DIFFERENCE BETWEEN PROGRAMS BEING TRANSMITTED TO TWO DIFFERENT RECEIVERS

(75) Inventor: Paul McAlinden, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 602 days.

(21) Appl. No.: 09/909,213

(22) Filed: Jul. 19, 2001

(65) Prior Publication Data

US 2003/0017800 A1    Jan. 23, 2003

(51) Int. Cl.
*H04H 1/00* (2006.01)

(52) U.S. Cl. .................. 455/3.01; 455/231; 725/94; 725/93

(58) Field of Classification Search .......... 455/3.01, 455/3.02, 3.03, 3.04, 3.06, 3.05, 132, 149, 455/272, 66.1, 12.1, 231; 340/825.24, 825.25; 725/29, 87, 93, 95, 97, 94; 381/77–85; 348/328, 348/7

See application file for complete search history.

(56) References Cited

U.S. PATENT DOCUMENTS

| | | | |
|---|---|---|---|
| 5,572,442 A * | 11/1996 | Schulhof et al. | 709/219 |
| 5,689,507 A * | 11/1997 | Bloks et al. | 370/389 |
| 5,724,646 A * | 3/1998 | Ganek et al. | 725/89 |
| 5,884,141 A * | 3/1999 | Inoue et al. | 725/101 |
| 6,018,359 A * | 1/2000 | Kermode et al. | 725/101 |
| 6,115,366 A * | 9/2000 | Campanella et al. | 370/319 |
| 6,282,713 B1 * | 8/2001 | Kitsukawa et al. | 725/36 |
| 6,535,717 B1 * | 3/2003 | Matsushima et al. | 455/18 |
| 6,801,544 B1 * | 10/2004 | Rijckaert et al. | 370/473 |

OTHER PUBLICATIONS

XP000537013 Reducing I/O Demand in Video On Demand Storage Service.*
XP000700330 Improving Bandwidth efficiency of Video on deman servers Jan. 14, 1999.*
Aggarwal et al., *On Optimal Piggyback Merging Policies for Video-On Demand Systems*, ACM Sigmetrics Intl. Conference on Measurement and Modeling of Computer Systems, Philadelphia, May 1996, pp. 200-209.
Golubchik et al., *Reducing I/O Demand in Video-On-Demand Storage Servers*, ACM Sigmetrics Joint Intl. Conference on Measurement and Modeling of Computer Systems, Ottawa, May 1995, pp. 25-36.
Carter et al., *Improving Bandwidth Efficiency of Video-On-Demand Servers*, Computer Networks and ISDN Systems, N. Holland Publishing, Amsterdam, NL, vol. 31, 1999, pp. 111-123.

* cited by examiner

*Primary Examiner*—Tilahun Gesesse
(74) *Attorney, Agent, or Firm*—Trop, Pruner & Hu, P.C.

(57) ABSTRACT

A content distribution system may distribute content to a plurality of receivers on demand. When it is determined that two different receivers are receiving the same program but one receiver requested the information prior to the other, bandwidth may be conserved by increasing the rate of data flow to one user and decreasing the rate of data flow to another user, in one embodiment, until such time as both users are receiving the same portion of the program at the same time. In such case, the program may be simultaneously distributed to two users on the same channel, conserving bandwidth.

27 Claims, 3 Drawing Sheets

REDUCING THE TIME DIFFERENCE BETWEEN PROGRAMS BEING TRANSMITTED TO TWO DIFFERENT RECEIVERS

BACKGROUND

This invention relates generally to systems for distributing information to a plurality of users.

Information may be broadcast to a plurality of users in a variety of environments. Information may be wirelessly transmitted from a network server to a plurality of wirelessly coupled processor-based systems. In addition, hard wired systems may be utilized to distribute information such as television programming to a variety of different users. In one scenario, a catalog of programs is available for distribution upon program selection to a plurality of receivers. Each receiver may determine which program to view.

For example, in a cable television distribution system, each home may have its own receiver. Each user can decide what video information to receive in a so-called video on demand system. When the user selects a particular video, that video is streamed to the user over the available transmission medium.

Obviously, if the transmission medium has a limited bandwidth and there are a large number of users, the possibility exists that each user may pick a different program, taxing the bandwidth of the transmission medium. In addition, different users may expect to receive video on demand, i.e., upon selection. Thus, different users may select the same video but may do so at different times. Because of the time difference between the selections, the same video may be transmitted to two different receivers but two different channels may be required because of the difference in start time of each video.

As a result, transmissions, such as video transmissions, to a large number of users may result in the consumption of relatively large amounts of bandwidth. The resulting bandwidth requirements may tax available resources. As a result, video on demand systems for example, are not widely available at this time.

Thus, there is a need for better ways to conserve bandwidth in the distribution or transmission systems for distributing information to a plurality of users.

DETAILED DESCRIPTION

Figure 1:
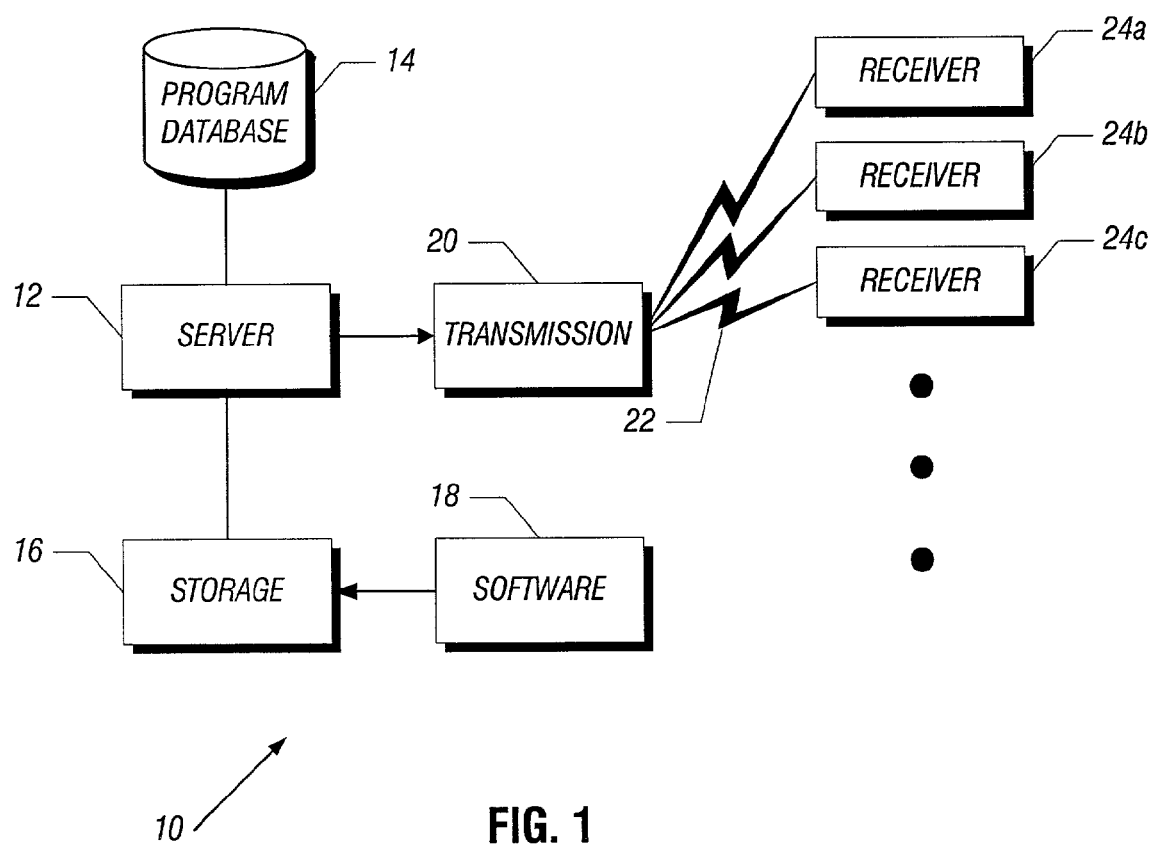
FIG. 1 is a schematic depiction of a system in accordance with one embodiment of the present invention.

A distribution system 10, shown in FIG. 1, can distribute information from database 14 to a plurality of receivers 24, only three of which are shown in FIG. 1. The distribution medium 22 may be an airwave medium such as a conventional broadcast transmitter, a satellite distribution medium, or a hard wired medium using cable or optical fibers as two examples.

The system 10 may take a variety of different forms and may be involved in many different applications. For example, in one embodiment, the system 10 may be a cable distribution system that distributes video on demand. As another example, the system 10 may be a telephone system that provides information to a plurality of receivers 24 in the form of telephone receivers. The telephone receivers may be wireless or cellular telephones. As still another example, the system 10 may be a network that distributes information to a plurality of receivers 24 in the form of processor-based systems. In one example, the system 10 may be a local area network (LAN) including wired or wireless LANs. As another example, it may be a metropolitan area network (MAN).

The system 10 may include a server 12 coupled to the program database 14 and a storage 16 coupled to the server 12. A transmission system 20 may be coupled to the server 12 to place data from the program database 14 in an appropriate format for transmission over the available transmission medium 22. Software 18 may control the transmission of data by the server 12 and that software 18 may be stored on the storage 16.

In one embodiment, programs stored on the program database 14 are distributed to receivers 24. While the word "program" is utilized in connection with the database 14, it should be understood that the present invention is in no way limited to television programs. It may apply to music, video, television programs, commercials, software and games, to mention a few examples. Thus, the term program is simply used to refer to any electronic file that is distributed by the server 12 to the receivers 24.

Figure 2A:
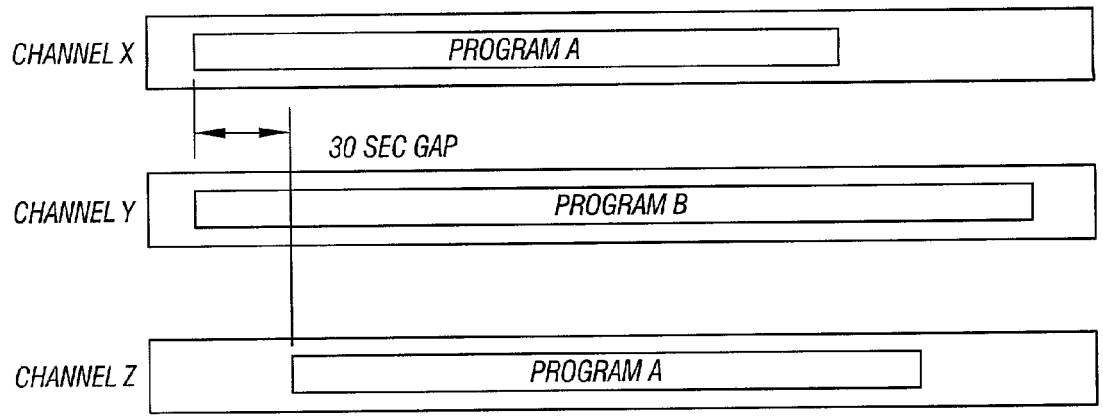
FIGS. 2A through 2C are timing diagrams for three different channels in accordance with one embodiment of the present invention.
Figure 2B:
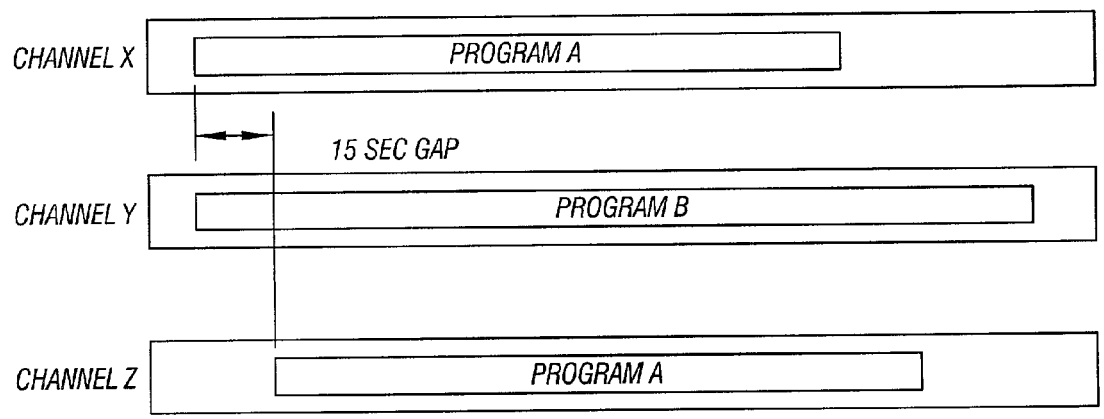
Figure 2C:
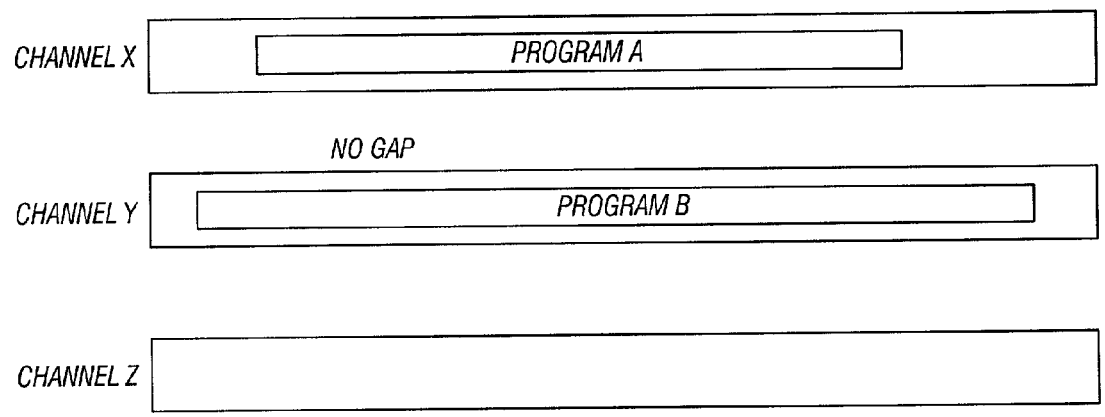

Turning to FIGS. 2A through 2C, in some cases, the same program may be distributed to more than one receiver 24 such as receivers 24a and 24b. In some cases, the programs are distributed on an on-demand basis. Thus, the distribution of the program begins upon receipt of a request from a receiver 24. As a result, two programs may be distributed to two different receivers. Two different channels may be needed to distribute the information because the programs are streamed to the receivers 24 and one receiver 24 may have begun receiving the transmission before another receiver 24. As a result, the amount of bandwidth required to transmit the same program starting at different times to two different receivers corresponds to the bandwidth that would be needed to distribute different programs to two different receivers.

As shown in FIG. 2A, a channel X may be utilized to distribute a program A to receiver 24a, channel Y may be utilized to distribute a program B to receiver 24b, and channel Z may be utilized to distribute a program A to receiver 24c. However, the distribution to receiver 24a may begin 30 seconds, as one example, before the distribution of the same program to the receiver 24c. As a result, three different channels may be utilized to accomplish the distribution of two programs to three receivers 24.

Referring to FIG. 2B, the software 18 stored on the server 12 may enable the server 12 to attempt to decrease the time difference between the distribution of program A to receivers 24a and 24c. At periodic intervals, spacing may be provided in the distribution of the program to the receiver 24a and the distribution of the program to the receiver 24c may be similarly compressed in some embodiments.

Techniques for expanding or compressing streaming files are well known. In one embodiment, a filler may be provided. In another embodiment, different degrees of compression or lack thereof may be utilized.

Progressively, over time, as shown in FIGS. 2B and 2C, the gap between the program on channel X and the same program on channel Z is decreased until there is no gap whatsoever as shown in FIG. 2C. As a result, the program A may be sent to both receivers 24a and 24c using channel X. This frees channel Z for the distribution of other content.

Figure 3:
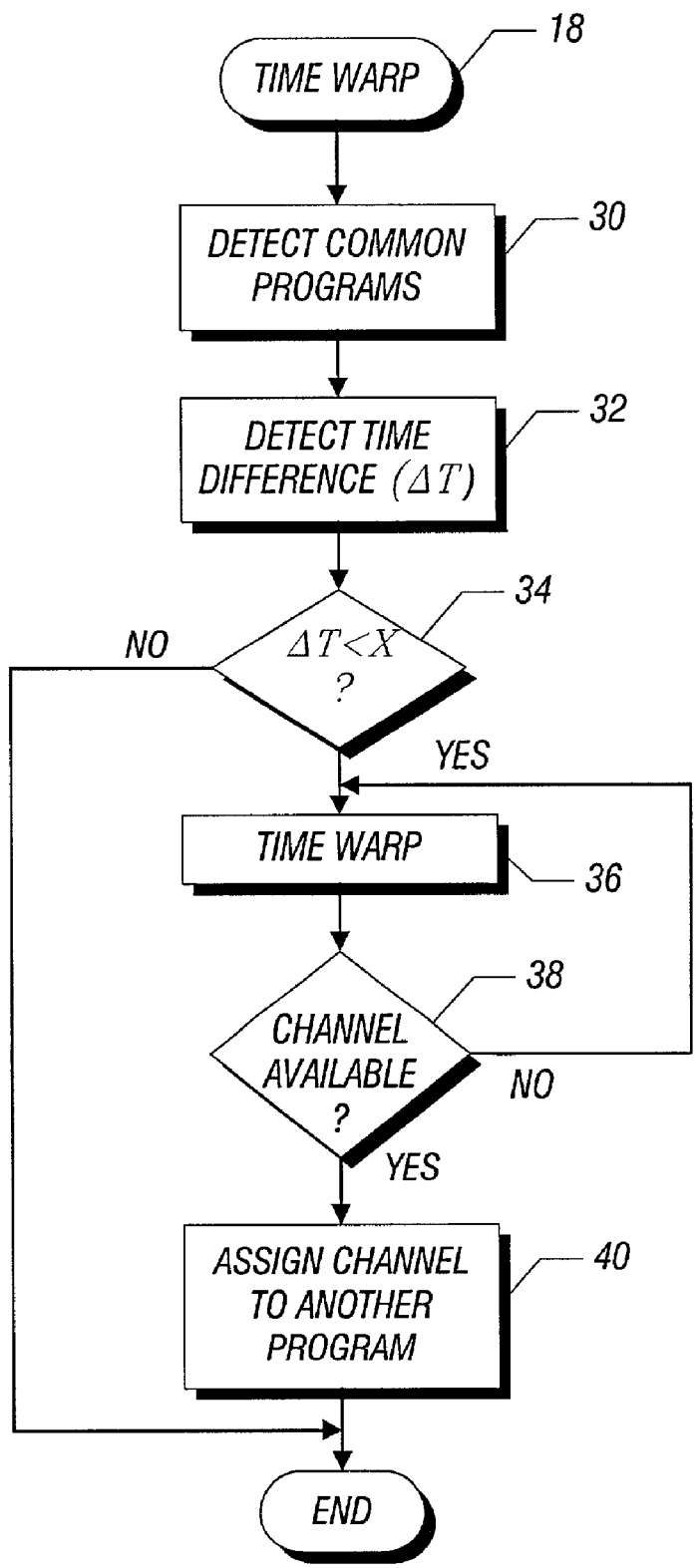
FIG. 3 is a flow chart for software in accordance with one embodiment of the present invention.

Turning to FIG. 3, the software 18 begins by detecting common programs on different channels as indicated in block 30. When such a situation is detected, the time difference between the programs (delta T) is determined as indicated in block 32.

A check at diamond 34 determines whether the time difference is less than a predetermined amount of time. The predetermined amount of time may be an amount of time such that is not worth attempting to remove the time difference. In some cases, the amount of compression or packing that may be needed to save bandwidth may unduly distort the programming. In such case, the separate channel distribution is maintained.

However, if the time difference is within an acceptable range, the time difference may be progressively removed, as indicated in block 36. Again, conventional techniques may be utilized to decrease the rate of data flow to one receiver 24 and/or to increase the rate of data flow to the other receiver 24.

Eventually, a check at diamond 38 determines whether the gap has been substantially removed and therefore, one of the two channels should be made available for other information as indicated in diamond 38. At the same time, one of the two channels may be assigned to distribute the same information on the same channel to both receivers. If a channel is now available, that channel may be assigned to another program as indicated in block 40. If not, the time warping continues in block 36.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for distributing programming content comprising:
   transmitting programs to two different receivers;
   determining a time difference between a first program transmitted to a first receiver and a second program transmitted to a second receiver; and
   if the time difference is below a predetermined threshold, reducing the time difference between said programs via increasing the rate of content transmission of the rust program and decreasing the rate of content transmission of the second program until the time difference between said programs is substantially zero.

2. The method of claim 1 wherein transmitting programs to two different receivers involves distributing programs over a wireless network.

3. The method of claim 1 including transmitting programs to two different receivers in response to two different requests for programs.

4. The method of claim 3 including transmitting programs in an on demand basis.

5. The method of claim 1 including determining whether the time difference between the first program and the second program is above the predetermined threshold.

6. The method of claim 5, further comprising not reducing the time difference if the time difference is above the predetermined threshold.

7. The method of claim 1 wherein reducing the time difference between said programs includes time compressing one of said programs more than the other and transmitting said programs.

8. The method of claim 1 wherein reducing the time difference between said programs includes reducing the rate of data transfer of one of said programs.

9. The method of claim 1 including reducing the time difference between said programs until the time difference is substantially zero and then transmitting the first and second programs over the same channel to the two different receivers.

10. The method of claim 9 including initially transmitting the first and second programs on different channels, reducing the time difference between said programs on the different channels until the time difference is substantially zero, transmitting both programs on a first channel to the two different receivers and freeing a second channel for transmission of another program.

11. The method of claim 1, further comprising determining the time difference in a sewer associated with transmitting the programs.

12. An article comprising a machine-readable medium for storing instructions that, if executed, enable a processor-based system to:
    transmit programs to two different receivers;
    determine the time difference between a first program being transmitted to a first receiver and a second program being transmitted to a second receiver; and
    if the time difference is below a predetermined threshold, reduce the time difference between the programs until the time difference is substantially zero and then transmit the first and second programs over the same channel to two different receivers.

13. The article of claim 12 further storing instructions that enable the processor-based system to distribute programs over a wireless network.

14. The article of claim 12 further storing instructions that enable the processor-based system to transmit programs to two different receivers in response to two different requests for programs.

15. The article of claim 14 further storing instructions that enable the processor-based system to transmit programs on an on-demand basis.

16. The article of claim 12 further storing instructions that enable the processor-based system to determine whether the time difference between the first program and the second program is above the predetermined threshold.

17. The article of claim 16, further storing instructions that enable the processor-based system to not reduce the time difference if the time difference is above the predetermined threshold.

18. The article of claim 12 further storing instructions that enable the processor-based system to time compress one of said programs more than the other and transmit said programs.

19. The article of claim 12 further storing instructions that enable the processor-based system to reduce the rate of data transfer of one of said programs to reduce the time difference between said programs.

20. The article of claim 12 further storing instructions that enable the processor-based system to increase the rate of content transmission of the first program and decrease the rate of content transmission of the second program until the time difference between said programs is substantially zero.

21. The article of claim 12 further storing instructions that enable the processor-based system to initially transmit the first and second programs on the different channels, reduce the time difference between the programs on different channels until the time difference is substantially zero, transmit both programs on a first channel to the two different receivers and free a second channel for transmission of another program.

22. A system for distributing content comprising:
- a server;
- a transmission device coupled to said server;
- a database of electronic files;
- a storage storing instructions that enable the server to transmit files to two different receivers over said transmission device, determine the time difference between a first file being transmitted to a first receiver and a second file being transmitted to a second receiver and if the time difference is below a threshold, reduce the time difference between the files via a reduction in the rate of content transfer of one of said first and second files.

23. The system of claim 22 wherein said transmission device is coupled to transmit files over a wireless network.

24. The system of claim 22 wherein said transmission device is a cable network transmission device.

25. The system of claim 22 wherein said storage stores instructions that enable the server to determine whether the time difference between the first and the second file is above the threshold.

26. The system of claim 25, wherein said storage stores instructions that enable the server to not reduce the time difference if the time difference is above the threshold.

27. The system of claim 22 wherein said storage stores instructions that enable the server to determine
- whether the time difference between the first file and the second file is sufficient to attempt to reduce the time difference between the files.

* * * * *